(12) United States Patent
Kuwabara et al.

(10) Patent No.: US 8,602,479 B2
(45) Date of Patent: Dec. 10, 2013

(54) INSTRUMENT PANEL SUPPORT STRUCTURE OF VEHICLE

(71) Applicant: Mazda Motor Corporation, Hiroshima (JP)

(72) Inventors: Koji Kuwabara, Kure (JP); Masayoshi Ono, Kure (JP); Kazuhiro Tanaka, Hiroshima (JP); Kazunari Shimada, Hiroshima (JP); Tadashi Yamazaki, Hiroshima (JP); Yasuhiko Nishida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/658,439

(22) Filed: Oct. 23, 2012

(65) Prior Publication Data

US 2013/0134736 A1    May 30, 2013

(30) Foreign Application Priority Data

Nov. 24, 2011    (JP) .................................. 2011-255750

(51) Int. Cl.
*B62D 25/14*    (2006.01)

(52) U.S. Cl.
USPC ............................................ 296/72; 180/90

(58) Field of Classification Search
USPC ........... 296/70, 72, 187.03, 187.09, 192, 208, 296/187.04, 193.02; 248/27.1; 180/90
See application file for complete search history.

(56) References Cited

U.S. PATENT DOCUMENTS

| | | | |
|---|---|---|---|
| 5,707,100 A * | 1/1998 | Suyama et al. | 296/192 |
| 7,604,278 B2 * | 10/2009 | Penner | 296/72 |
| 2004/0026952 A1 * | 2/2004 | Shiono | 296/70 |
| 2004/0094986 A1 * | 5/2004 | Landvik et al. | 296/70 |
| 2011/0068607 A1 * | 3/2011 | Ott et al. | 296/192 |

FOREIGN PATENT DOCUMENTS

JP    2009-208574 A    9/2009

* cited by examiner

*Primary Examiner* — Glenn Dayoan
*Assistant Examiner* — Pinel Romain
(74) *Attorney, Agent, or Firm* — Studebaker & Brackett PC

(57) ABSTRACT

An instrument panel which is supported at a cowl panel at a front-side portion thereof is provided. The cowl panel includes an upper face wall which faces to a windshield from below, a bending portion which is formed at a rear end of the upper face wall and bendable in a vehicle collision, and a rear face wall which extends downward from the bending portion and has a lower portion connecting to a dash panel. The instrument panel includes a first restriction portion to restrict a downward move of the instrument panel by contacting the upper face wall of the cowl member, and a second restriction portion to restrict an upward move of the instrument panel by said rear face wall of the cowl member at a lower portion of the front-side portion thereof.

8 Claims, 6 Drawing Sheets

INSTRUMENT PANEL SUPPORT STRUCTURE OF VEHICLE

BACKGROUND OF THE INVENTION

The present invention relates to an instrument panel support structure of a vehicle, and in particular, relates to an instrument panel support structure of a vehicle which is equipped with restriction portions to respectively restrict a move, in a vertical direction, of a front-side portion of an instrument panel.

Conventionally, an instrument panel of a vehicle is comprised of a large-sized synthetic-resin article which extends over a whole width of a vehicle compartment, and an air-conditioning unit, an audio unit, plural ducts and others are provided inside this instrument panel. The instrument panel is assembled in a separate assembly line which is different from a vehicle assembling line. In a later step after frames of a vehicle body are assembled, this assembled instrument panel is carried into the vehicle compartment through an ingress-and-egress opening where side doors are attached, then moved forward, and fixed to a particular bracket which is provided at a cowl panel supporting a lower edge portion of a windshield (front window). Thus, the instrument panel is assembled to the vehicle body.

Since the synthetic-resin made instrument panel is provided in an engine room via a dash panel and some electric-component units are stored inside the instrument panel, the instrument panel tends to receive the heat influence from inside or outside thereof. Further, the instrument panel has a shape in which the length, in a vehicle width direction, thereof is relatively long, so that a portion of the instrument panel may warp (curve) vertically in the vehicle width direction. Accordingly, some technologies as countermeasures against this improper warp of the instrument panel which may be caused by this thermal expansion have been proposed.

Japanese Patent Laid-Open Publication No. 2009-208574 discloses an instrument panel attachment structure which comprises a synthetic-resin made instrument panel, an air box (cowl box) having a closed cross section which extends in a vehicle width direction and is formed by a box-forming portion and a box-forming panel (cowl panel) which extend upward from a dash upper panel, and a projection portion extending rearward from a rear face wall of the air box and a positioning pin, wherein an engagement projection contacting a lower face of the projection portion and a locate bracket into which the positioning pin can be inserted are formed integrally with a front-side portion of the instrument panel. According to the above-described instrument panel attachment structure, the above-described warp in the vehicle width direction of the instrument panel can be prevented properly, without providing any particular bracket for attaching the instrument panel.

The cowl panel supporting a lower edge portion of the windshield constitutes, together with the dash upper panel (may be called as "cowl member"), the cowl box which has a corner portion and extends in the vehicle width direction. This cowl box is required to have an impact-absorption function that the rigidity of a front portion of a vehicle body can be ensured, while the impact acting on a pedestrian falling down onto a bonnet (engine hood) in a vehicle's collision against the pedestrian can be reduced. Therefore, some pedestrian protection structure, in which the cowl box is movable rearward and upward relative to the vehicle body when the impact load acts on the cowl box from the vehicle front, has been proposed in order to increase the impact-absorption performance for the pedestrian.

There has been recently a tendency that a slant angle of the windshield is designed to be large (great) to improve the aerodynamics or designing of the vehicle. Such a vehicle with the large (great) slant angle of the windshield has a concern that a gap between the windshield and the cowl panel is so narrow that it may be difficult to ensure a working space for attaching the instrument panel properly. In particular, in an instrument panel support structure in which the instrument panel is kept at a high level and carried forward, then lowered to the particular bracket provided at the cowl panel, and finally assembled to the vehicle body, there is a concern that the attaching works may deteriorate improperly. Further, it may be required to make the gap between the windshield and the cowl panel narrower in order to ensure the impact-absorption function of the cowl panel from a pedestrian-protection perspective. In this case, the similar concern described above may occur.

Since the engagement projection contacting the lower face of the projection portion and the locate bracket into which the positioning pin can be inserted are formed integrally with the front-side portion of the instrument panel in the instrument panel attachment structure disclosed in the above-described patent publication, the engagement projection and the locate bracket are engaged with the projection portion provided at the cowl panel and the positioning pin when the instrument panel is assembled to the vehicle body. However, according to the above-described instrument panel attachment structure, the cowl box is not movable rearward and upward relative to the vehicle body in the collision of the vehicle against the pedestrian, so that there is a concern that the impact acting on the pedestrian may not be reduced properly.

SUMMARY OF THE INVENTION

An object of the present invention is to provide an instrument panel support structure of a vehicle having a narrow gap between the windshield and the cowl member, which can provide both the anti-warp performance of the instrument panel in the vehicle width direction and the impact-absorption performance for the pedestrian, ensuring the proper attaching works of the instrument panel.

According to the present invention, there is provided an instrument panel support structure of a vehicle, comprising a cowl member supporting a windshield, the cowl member including an upper face wall which faces to the windshield from below, a bending portion which is formed at a rear end of the upper face wall and bendable in a vehicle collision, and a rear face wall which extends downward from the bending portion and has a lower portion connecting to a dash panel, and an instrument panel supported at the cowl member at a front-side portion thereof, the instrument panel including a first restriction portion and a second restriction portion at a lower portion of the front-side portion thereof, the first restriction portion being configured to restrict a downward move of the instrument panel by contacting the upper face wall of the cowl member, the second restriction portion being configured to restrict an upward move of the instrument panel by the rear face wall of the cowl member.

According to the instrument panel support structure of a vehicle of the present invention, since the instrument panel includes the first restriction portion to restrict the downward move of the instrument panel by contacting the upper face wall of the cowl member and the second restriction portion to restrict the upward move of the instrument panel by the rear face wall of the cowl member at the lower portion of the front-side portion thereof, even in a situation in which the gap between the windshield and the cowl member is narrow, the instrument panel can be supported at the upper face wall and the rear face wall of the cowl member, without being lifted up to a high position. Thereby, the proper attaching works of the instrument panel can be ensured. Since the downward move of the instrument panel is restricted by the first restriction portion and the upward move of the instrument panel is restricted by the second restriction portion, the warp in the vehicle width direction of the instrument panel which may be caused by the thermal expansion can be prevented surely. Further, since the first and second restriction portions cause a folding move of the upper face wall and the rear face wall with a bending base point of the bending portion which is caused by an impact load acting on the cowl box from the vehicle front when the vehicle collides against the pedestrian, the impact acting on the pedestrian can be reduced properly. Therefore, in the vehicle having the narrow gap between the windshield and the cowl member, both the anti-warp performance of the instrument panel in the vehicle width direction and the impact-absorption performance for the pedestrian can be provided, ensuring the proper attaching works of the instrument panel.

According to an embodiment of the present invention, the second restriction portion which extends obliquely forward and downward from the lower portion of the front-side portion of the instrument panel contacts a bracket which extends obliquely rearward and upward from the rear face wall of the cowl member. Thereby, an arrangement space in the longitudinal direction of the second restriction portion can be made properly small, and attaching of the instrument panel can be facilitated.

According to another embodiment of the present invention, the second restriction portion is formed integrally with a duct member which is provided at the instrument panel. Thereby, the appropriate contact strength of the second restriction portion with the cowl member can be ensured, without increasing the number of parts improperly.

According to another embodiment of the present invention, the first and second restriction portions are respectively comprised of plural portions which are located away from each other in a vehicle width direction. Thereby, the front-side portion of the instrument panel can be supported stably regardless of the position where the warp occurs.

Other features, aspects, and advantages of the present invention will become apparent from the following description which refers to the accompanying drawings.

DETAILED DESCRIPTION OF THE INVENTION

Figure 1:
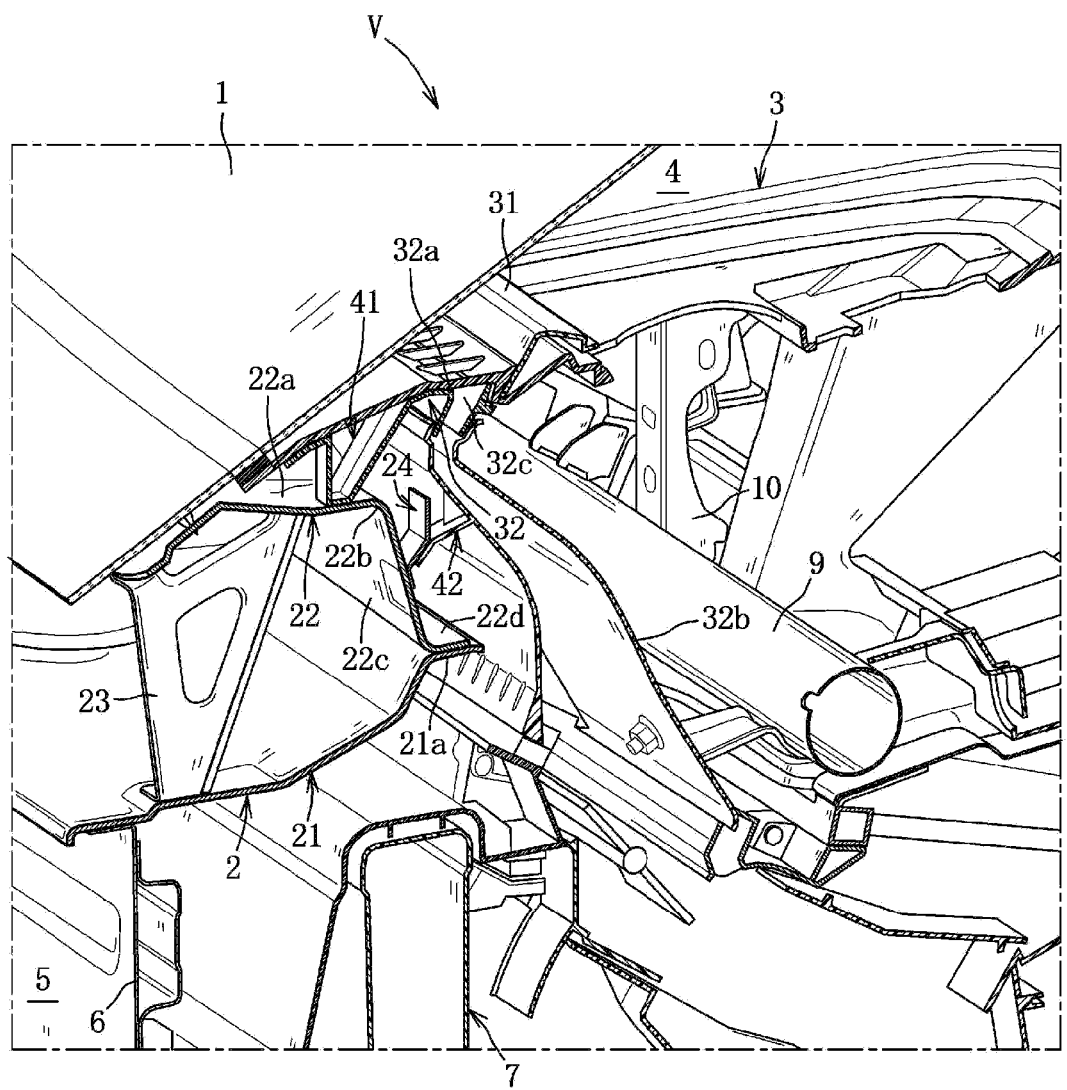
FIG. 1 is a perspective sectional of an instrument panel support structure according to an embodiment of the present invention.
Figure 2:
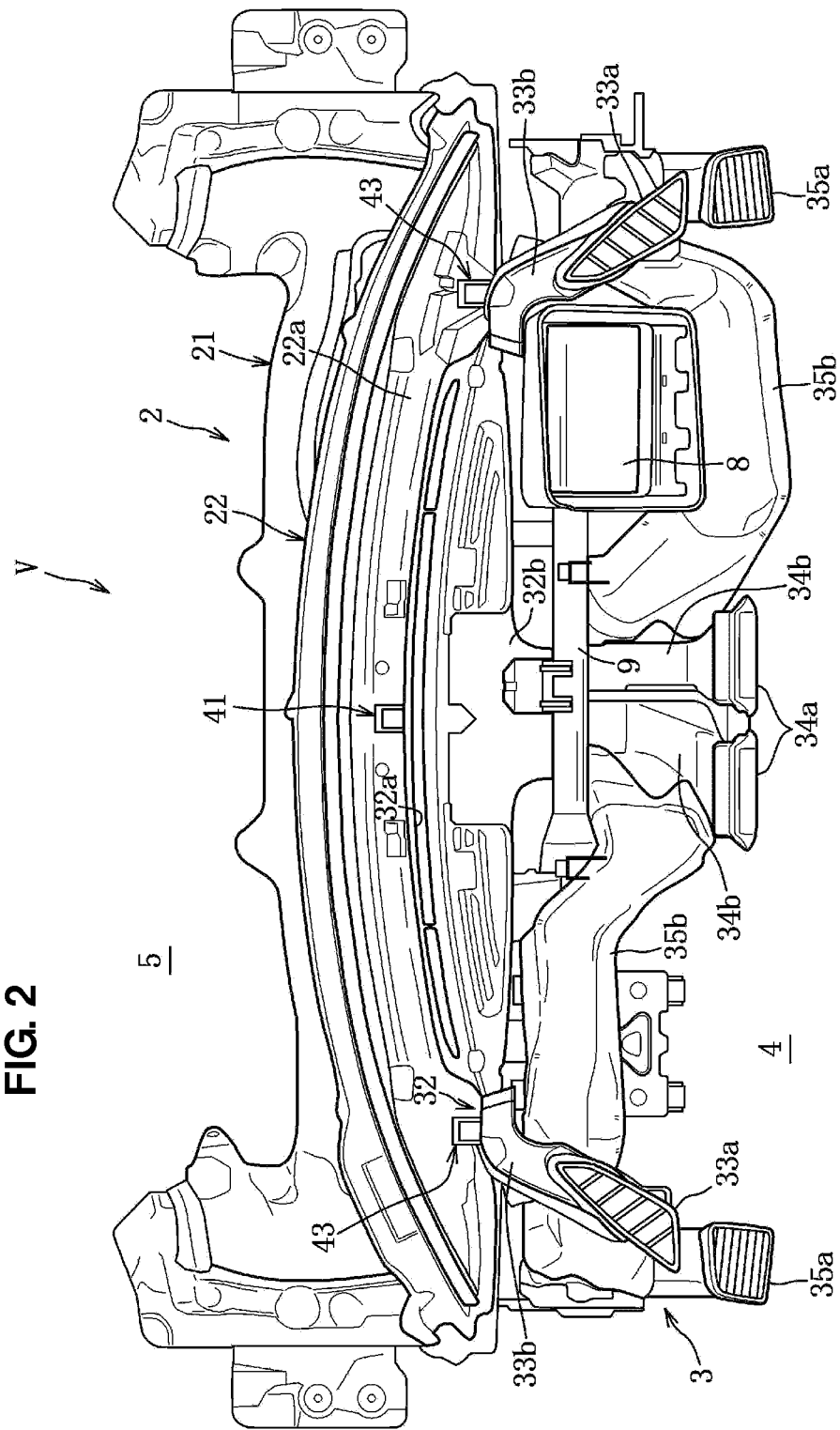
FIG. 2 is a plan view of the instrument panel in which an instrument panel body is detached.

Hereafter, a preferred embodiment of the present invention will be descried referring to an example. Herein, a longitudinal direction relative to an advancing direction of a vehicle will be referred to as "longitudinal direction," and a lateral direction of a vehicle body will be referred to as "lateral direction."

The embodiment of the present invention will be described referring to FIGS. 1 through 7. As shown in FIGS. 1-4 and 7, at a front portion of a vehicle V are provided a cowl box 2 which supports a windshield 1, a synthetic-resin made instrument panel 3 which is supported at the cowl box 2 at a front-side portion thereof, and other members.

The cowl box 2 constitutes a portion of an air supply passage, through which outside air introduced from a vehicle front is supplied to a vehicle compartment 4. The cowl box 2 is provided to extend over a whole width in a vehicle width direction at a rear lower position of a bonnet (engine hood), not illustrated, which longitudinally partitions an engine room 5 from the vehicle compartment 4, cooperating with a dash panel 6 which extends rearward and downward from a lower portion of the cowl box 2.

As shown in FIGS. 1, 3, 4 and 7, the cowl box 2, which is formed to have a substantially-rectangular cross section, is connected to a pair of right-and-left front pillars (not illustrated) and rear ends of a pair of right-and-left front frames (not illustrated), and comprises a cowl member 21 which forms a lower-side portion of the cowl box 2, a cowl panel 22 which forms an upper-side portion of the cowl box 2, plural reinforcing members 23, and others. The cowl member 21 is formed in a gutter shape extending in the vehicle width direction, and has a flange 21a which extends rearward from a read end thereof. An upper end portion of the dash panel 6 is connected by welding to a middle portion, in the longitudinal direction, of the cowl member 21.

The cowl panel 22, which is made of a steel plate, comprises an upper face wall 22a which faces to the windshield 1 from below, a bending portion 22b which is formed at a rear end of the upper face wall 22a in a curve-line shape in a plan view, a rear face wall 22c which extends downward from the bending portion 22b, and a flange 22d which extends rearward from the rear face wall 22c.

The upper face wall 22a is configured such that its front-side portion protrudes toward the windshield 1, joined to an inside portion of a lower edge portion of the windshield 1 by an adhesive agent, and has a flat portion which extends rearward from a connection portion thereof to the windshield 1 toward the bending portion 22b. The bending portion 22b extends over a whole width, in the vehicle width direction, of the cowl box 2, and is configured to be bendable such that the upper face wall 22a and the rear face wall 22c approach to each other with a bending base point of the bending portion 22b when an impact load acts on the cowl box 2 from the front toward the rear of the vehicle V. The rear face portion 22c has a flat portion which extends downward from the bending portion 22b to a rear end of the flange 22d. The flange 22d is connected to the flange 21a of the cowl member 21 by overlap welding. Therefore, a lower portion of the rear face wall 22c is connected to the dash panel 6 via the flanges 21a, 22d. Thereby, when the impact load acts from the front of the vehicle V, the upper face wall 22a and the rear face wall 22c can be deformed to their folding state with the bending base point of the bending portion 22b from their initial state in which an intersectional angle between the upper face wall 22a and the rear face wall 22c is set to be about 90 degrees.

The plural reinforcing members 23 are formed in a substantially triangular shape, respectively, and arranged in the vehicle width direction inside the front-side portion of the cowl box 2. Two top portions of each of the reinforcing members 23 are connected to an inside portion of the upper face wall 22a at a front-side position and a rear-side position, and one top portion thereof is connected to an inside portion of the cowl member 21 at a position in back of the dash panel 6. Thereby, the torsional rigidity and the strength of the cowl box 2 can be improved.

Next, the instrument panel 3 will be described. The instrument panel 3 comprises an instrument panel body 31 which forms a frame of the instrument panel 3, a synthetic-resin made defroster plate 32 which is vibration-welded to a back face portion of the instrument panel body 31, and a synthetic-resin made center defroster duct 32b which is engaged with the defroster plate 32. An air-conditioning unit 7, an airbag unit 8, an audio unit (not illustrated) and others are installed to this instrument panel 3. The instrument panel body 31 is comprised of an upper layer forming an upper face, a foaming layer as a middle layer, and a base layer forming a back face, which has a three-layer structure made from synthetic-resin materials primarily. This instrument panel body 31 is formed to have a letter-U-shaped cross section such that it protrudes toward the inside of the vehicle compartment 4 from the cowl box 2. A urethane sealing member is attached to an upper face portion of a front end of the instrument panel body 31 such that a space between the instrument panel body 31 and the windshield 1 is sealed. A support bracket 10 to support the instrument panel 3 at an instrument panel member 9 extending in the vehicle width direction is substantially vertically connected to a back face portion of the instrument panel body 31.

The air-conditioning unit 7 comprises a heater core (not illustrated) and an evaporator (not illustrated) which are provided behind the dash panel 6. The air-conditioning unit 7 is connected to a center defroster supply port 32a via the center defroster duct 32b, to a pair of right-and-left side defroster supply ports 33a via a pair of right-and-left side defroster ducts 33b, to a center vent supply ports 34a via a center vent duct 34b, and to a pair of right-and-left side vent supply ports 35a via a pair of right-and-left side vent ducts 35b. The center defroster supply port 32a, the pair of right-and-left side defroster supply ports 33a, and a portion of the pair of right-and-left side defroster ducts 33b are provided at the center defroster duct 32b. Herein, these respective supply ports 32a-35a and these respective ducts 32b-35b are all made of a synthetic-resin material.

The center defroster supply port 32a extends in the vehicle width direction so as to face to a lower-side inner face of the windshield 1 and is formed in a substantially crescent shape, in the plan view, along the cowl panel 22. The center defroster duct 32b is formed such that its upper portion is wider, a tip of which is engaged with an engagement portion 32c which projects downward from a specified portion of the defroster plate 32 which corresponds to the center defroster supply port 32a, and a base end of which is connected to the air-conditioning unit 7. The right-and-left side defroster supply ports 33a are arranged at positions which are located in back of and on the outside of both-side ends of the center defroster supply port 32a. Each of the right-and-left side defroster ducts 33b is comprised of a duct portion which extends outward from an upper-side end portion of the center defroster duct 32b and a duct portion which connects to the side defroster supply port 33a.

The center vent supply ports 34a are positioned at the center, in the vehicle width direction, of the instrument panel 3 and substantially at the same level as the instrument panel member 9. The right-and-left side vent supply ports 35a are provided below the right-and-left side defroster supply port 33a. Each of the right-and-left side vent ducts 35b branches off a midway portion of the center vent duct 34b toward the outside in the vehicle width direction. Herein, a storage recess portion to store an audio unit therein is formed at an upper portion of the center vent supply port 34a.

Hereinafter, the support structure of the instrument panel 3 will be described. The instrument panel 3 is assembled in a separate assembly line, which is different from an assembly line of the vehicle V, where vehicle equipments, such as the air-conditioning unit 7, the airbag unit 8, and the audio unit (not illustrated), are assembled. In a later step after frames of a vehicle body are assembled, this assembled instrument panel 3 is carried into the vehicle compartment 4 through an ingress-and-egress opening of a side door (not illustrated), and then assembled to the vehicle V. The instrument panel 3 is supported such that a front-side central portion of the instrument panel body 31 is supported at the cowl panel 22 via a first restriction portion 41 and a second restriction portion 42, right-and-left end portions of the instrument panel body 31 are supported at the cowl panel 22 via right-and-left first restriction portions 43 and right-and-left second restriction portions 44, right-and-left end portions of the instrument panel 3 are connected to the right-and-left front pillars, and the back face portion of the instrument panel body 31 is supported at the instrument panel member 9 via the support bracket 10.

Figure 3:
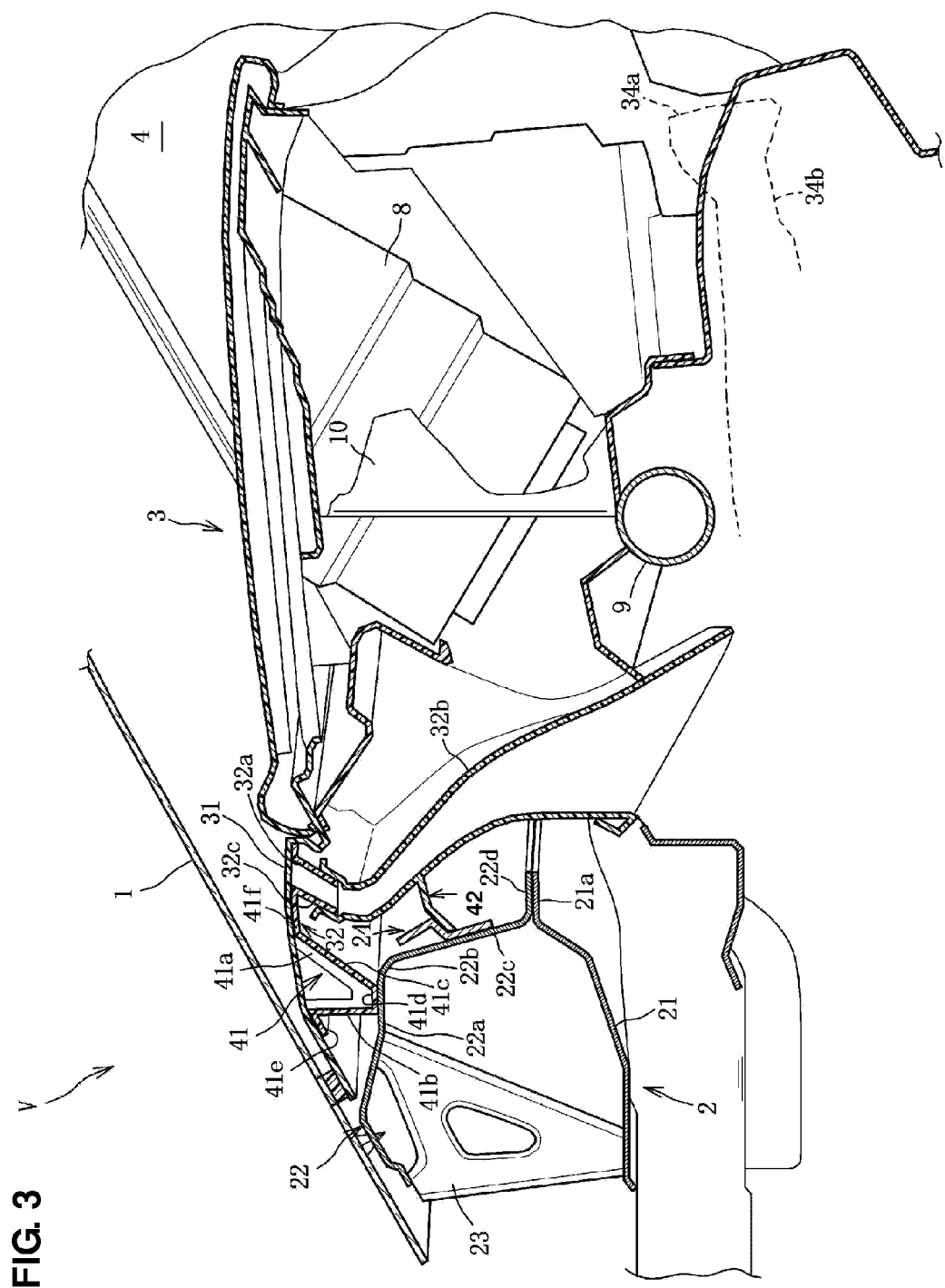
FIG. 3 is a vertical sectional view of the instrument panel support structure.
Figure 4:
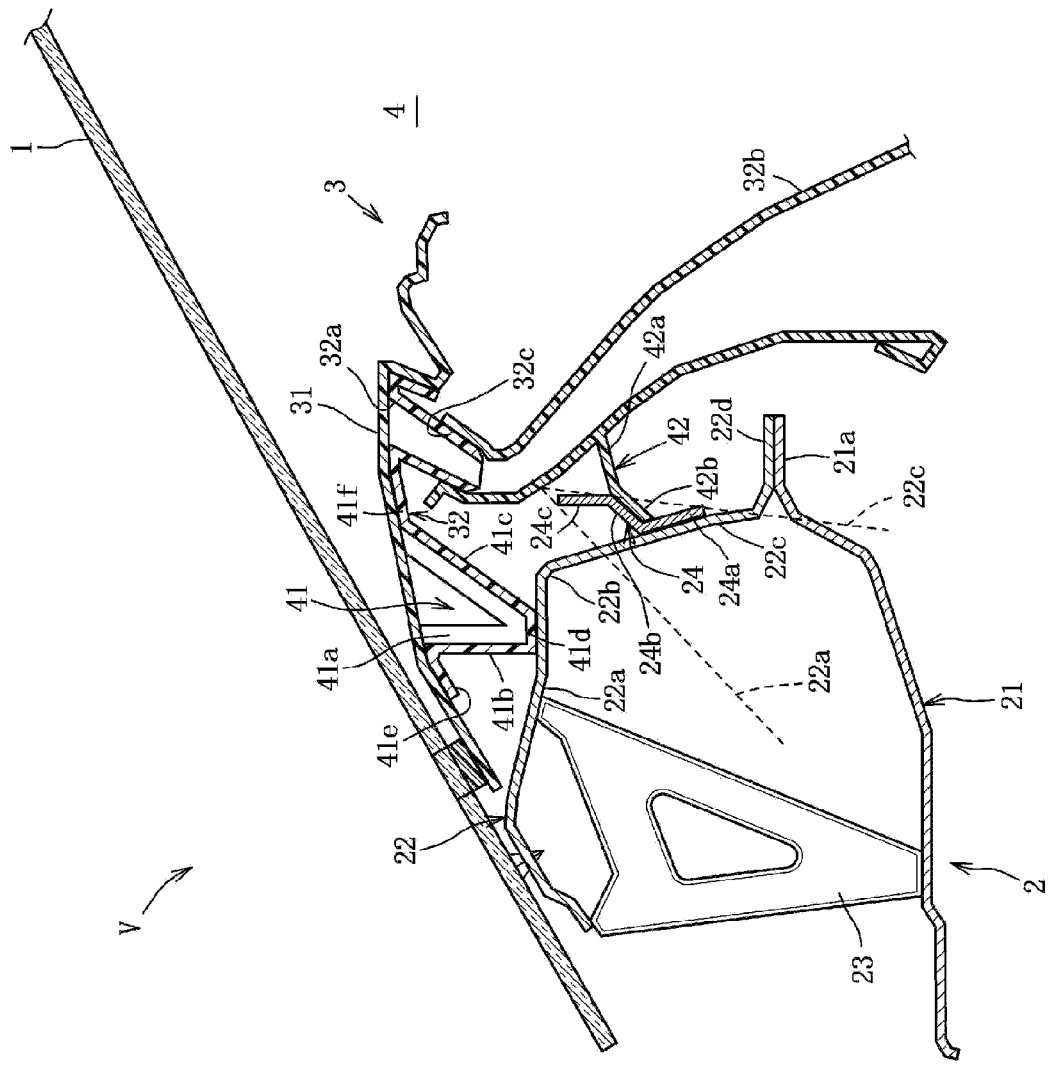
FIG. 4 is an enlarged view of a major portion of FIG. 3.
Figure 5:
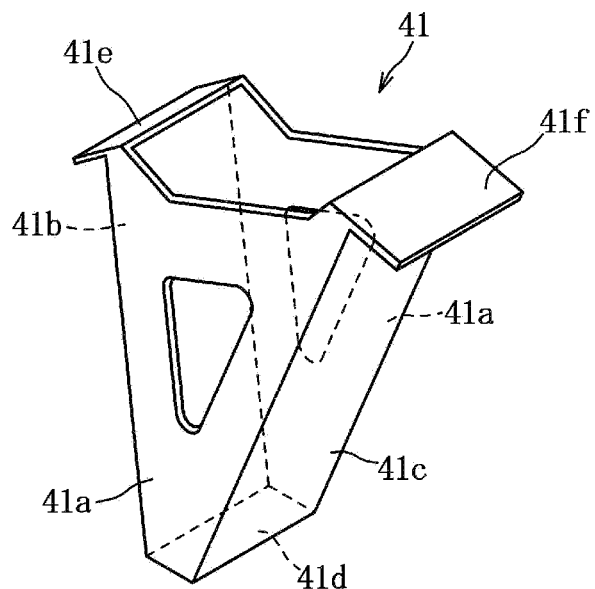
FIG. 5 is a perspective view of a first restriction portion.

As shown in FIGS. 1, 3 and 4, the first restriction portion 41 is integrally formed with the engagement portion 32c of the center defroster supply port 32a provided at the defroster plate 32. As shown in FIG. 5, the first restriction portion 41 is comprised of a pair of right-and-left reverse-trapezoid-shaped side walls 41a, a pair of front-and-rear rectangular front and rear walls 41b, 41c, a lower wall 41d which connects to respective lower ends of the right-and-left side walls 41a and the front-and-rear walls 41b, 41c, a front flange 41e which extends forward from an upper end of the front wall 41b, and a rear flange 41f which extends rearward from an upper end of the rear wall 41c and integrally connects to the engagement portion 32c. The right-and-left side walls 41a has an opening formed at a central portion thereof, and the front flange 41e and the rear flange 41f are welded to the back face portion of the instrument panel body 31.

The lower wall 41d is formed substantially in a flat shape, and arranged so that it has a face contact with a flat portion of the upper face wall 22a which extends rearward in back of the connection portion of the upper face wall 22a to the windshield 1. Thereby, the first restriction portion 41 can restrict the downward warp of the end portion (downward deformation of the central portion) of the instrument panel 3 which may be caused by the thermal expansion. Further, the first restriction portion 41 can, as shown by a broken line in FIG. 4, allow only the folding move (counter-clockwise move) of the upper face wall 22a with the bending base point of the bending portion 22b when the impact load acts on the cowl box 2 from the vehicle front.

As shown in FIGS. 1, 3 and 4, the second restriction portion 42 is integrally formed with the center defroster duct 32b. The second restriction portion 42 is formed substantially in a letter L shape and has a face contact with a restriction bracket 24 which is provided at the rear face wall 22c of the cowl panel 22. The second restriction portion 42 comprises a rear portion 42a which extends obliquely forward and downward from the center defroster duct 32b which corresponds to the lower portion of the front-side portion of the instrument panel 3 and a front portion 42b which bends obliquely forward and downward from a tip of the rear portion 42a.

The restriction bracket 24 is made of a metal plate and formed in a letter Z shape, and comprised of a connection portion 24a which is welded to a central position, in the vehicle width direction, of the rear face wall 22c of the cowl panel 22, a contact portion 24b which extends obliquely rearward and upward from the rear face wall 22c and has a face contact with the front portion 42b of the second restriction portion 42, and a guide portion 24c which guides the second restriction portion 42 downward in the assembly step of the instrument panel 3. The instrument panel 3 is installed to the vehicle V in a state in which the rear face wall 22 crosses the contact portion 24b (the front portion 42b) substantially with a right angle.

Figure 6A:
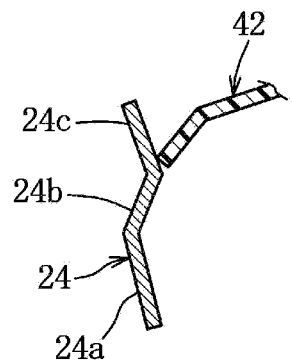
FIGS. 6A and 6B are state explanatory diagrams of a second restriction portion in an instrument panel attaching step, FIG. 6A showing an initial state of attaching and FIG. 6B showing a late state of attaching.

The operational states of the second restriction portion 42 and the restriction bracket 24 in the assembly step of the instrument panel 3 will be described referring to FIGS. 6A and 6B. When the instrument panel 3 is assembled, after the instrument panel 3 is carried into the vehicle compartment 4, it is moved forward, without being lifted up to a high position, as guide portions of a side bracket which are fixed to both ends of the instrument panel member 9 are guided by standard pins attached to front pillars. Herein, as shown in FIG. 6A, a tip of the front portion 42b comes to contact the guide portion 24c in a linear contact state and presses this portion 24c according to the forward move of the instrument panel 3, so that the slant angle of the contact portion 24b becomes gradually smaller from its initial angle and the front portion 42b of the second restriction portion 42 deforms downward according to the forward move. Then, the above-described standard pins come to engage with grooves of the guide portions, so that the instrument panel 3 moves downward and then its positioning can be complete. Thereby, a border of the guide portion 24c and the contact portion 24b moves upward, and the front portion 42b moves below the guide portion 24c.

Figure 6B:
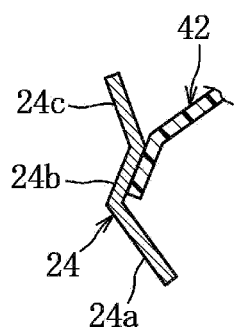

When the front portion 42b contacts the contact portion 24b, as shown in FIG. 6B, the front portion 42b and the contact portion 24b have a face contact, overlapping vertically, so that the slant angle of the contact portion 24b returns to the initial angle. Thereby, the second restriction portion 42 can restrict the upward warp of the end portion (upward deformation of the central portion) of the instrument panel 3 which may be caused by the thermal expansion. Further, the second restriction portion 42 can, as shown by the broken line in FIG. 4, allow only the folding move (clockwise move) of the rear face wall 22c with the bending base point of the bending portion 22b when the impact load acts on the cowl box 2 from the vehicle front.

Next, the pair of right-and-left first restriction portions 43 and the pair of right-and-left second restriction portions 44 will be described. Herein, the right-side first restriction portion 43 and the right-side second restriction portion 44 have similar structures to those of the left-side first restriction portion 43 and the left-side second restriction portion 44, respectively. Therefore, the left-side first restriction portion 43 and the left-side second restriction portion 44 will be described primarily.

Figure 7:
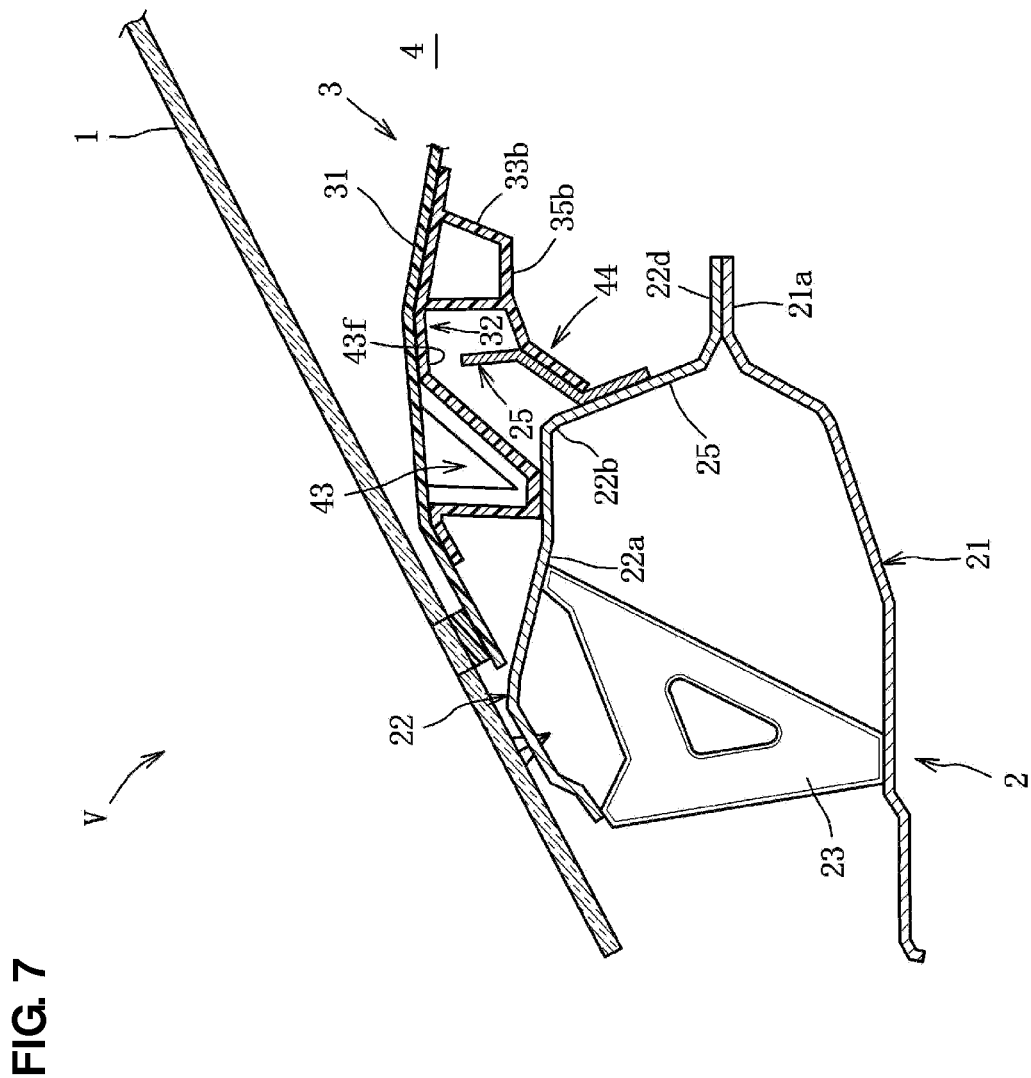
FIG. 7 is a view showing the left-side first restriction portion and the left-side second restriction portion, which corresponds to FIG. 4.

As shown in FIG. 7, the left-side first restriction portion 43 is provided at a front-side portion of the defroster plate 32. A rear flange 43f of the left-side first restriction portion 43 is formed integrally with the side defroster duct 33b and welded to back face portion of the instrument panel body 31. The other structure is similar to the first restriction portion 41. Thus, the left-side first restriction portion 43 can restrict the downward warp of the end portion of the instrument panel 3 which may be caused by the thermal expansion, and also can, as shown by the broken line in FIG. 4, allow only the folding move (counter-clockwise move) of the upper face wall 22a with the bending base point of the bending portion 22b when the impact load acts on the cowl box 2 from the vehicle front.

As shown in FIG. 7, the left-side second restriction portions 44 is formed integrally with the left-side side defroster duct 33b provided at the defroster plate 32 and extends forward and downward. The left-side second restriction portion 44 is formed substantially in a letter L shape, and able to have a face contact with a restriction bracket 25 which is provided at the rear face wall 22c of the cowl panel 22. The other structure is similar to the second restriction portion 42. The left-side restriction bracket 25 is welded to a left-side position of the rear face wall 22c, and the other structure is similar to the restriction portion 24. Thus, the left-side second restriction portion 44 can restrict the upward warp of the end portion of the instrument panel 3 which may be caused by the thermal expansion, and also can, as shown by the broken line in FIG. 4, allow only the folding move (clockwise move) of the rear face wall 22c with the bending base point of the bending portion 22b when the impact load acts on the cowl box 2 from the vehicle front.

Hereinafter, operations and effects of the instrument panel support structure of the vehicle according to the embodiment will be described. According to the present instrument panel support structure, since at the lower portion of the front-side portion of the instrument panel body 31 are provided the first restriction portions 41, 43 to restrict the downward move of the instrument panel 3 by contacting the upper face wall 22a of the cowl panel 22 and the second restriction portions 42, 44 to restrict the upward move of the instrument panel 3 by the rear face wall 22c of the cowl panel 22, even in a situation in which the gap between the windshield 1 and the cowl panel 22 is narrow, the instrument panel 3 can be supported at the upper face wall 22a and the rear face wall 22c of the cowl panel 22, without being lifted up to the high position. Thereby, the proper attaching works of the instrument panel 3 can be ensured. Since the downward move of the instrument panel 3 is restricted by the first restriction portions 41, 43 and the upward move of the instrument panel 3 is restricted by the second restriction portions 42, 44, the warp in the vehicle width direction of the instrument panel 3 which may be caused by the thermal expansion can be prevented surely. Further, since the first and second restriction portions 41-44 cause the folding move of the upper face wall 22a and the rear face wall 22c with the bending base point of the bending portion 22b which is caused by the impact load acting on the cowl box 2 from the vehicle front when the vehicle V collides against the pedestrian, the impact acting on the pedestrian can be reduced. Therefore, in the vehicle V having the narrow gap between the windshield 1 and the cowl panel 22, both the anti-warp performance of the instrument panel 3 in the vehicle width direction and the impact-absorption performance for the pedestrian can be provided, ensuring the proper attaching works of the instrument panel 3.

Since the second restriction portions 42, 44 contact the restriction brackets 24, which extend obliquely forward and downward from the lower portion of the front-side portion of the instrument panel 3 and extend obliquely rearward and upward from the rear face wall 22c, the arrangement space in the longitudinal direction of the second restriction portions 42, 44 can be made properly small, and attaching of the instrument panel 3 can be facilitated.

Since the second restriction portions 42, 44 are formed integrally with the center defroster duct 32b or the side vent duct 35b which are provided at the instrument panel 3, the appropriate contact strength of the second restriction portions 42, 44 with the cowl pane 22 can be ensured, without increasing the number of parts.

Since the first and second restriction portions 41-44 are respectively comprised of plural portions which are located away from each other in the vehicle width direction, the front-side portion of the instrument panel 3 can be supported stably regardless of the position where the warp occurs.

Next, some partially-modified examples of the above-described embodiment will be described.

1] While the above-described embodiment shows the example in which the first and second restriction portions are located at three positions of the central portion and the both-side end portions of the instrument panel, they may be located at a single position or four or more positions. Further, the first and second restriction portions may be comprised of any member independent from the respective duct members.

2] While the above-described embodiment shows the example in which the second restriction portion has the face contact with the restriction bracket fixed to the cowl panel, any other structure in which the second restriction portion directly contacts the rear face wall of the cowl panel may be applied as long as the folding move of the upper face wall and the rear face wall with the bending base point of the bending portion which is caused by the impact load acting on the cowl box from the vehicle front can be caused, restraining the warp of the instrument panel.

3] The present invention should not be limited to the above-described examples, and any other modifications or improvements may be applied within the scope of a sprit of the present invention.

What is claimed is:

1. An instrument panel support structure of a vehicle, comprising:
    a cowl member supporting a windshield, the cowl member including an upper face wall which faces the windshield from below, a bending portion which is formed at a rear end of the upper face wall and bendable in a vehicle collision, and a rear face wall which extends downward from the bending portion and has a lower portion connecting to a dash panel;
    an instrument panel member provided in back of and apart from the cowl member and extending in a vehicle width direction; and
    an instrument panel supported at the instrument panel member via a support member,
    wherein said instrument panel is further supported at said cowl member at a front-side portion thereof, the instrument panel including a first restriction portion and a second restriction portion at a lower portion of the front-side portion thereof, the first restriction portion being configured to restrict a downward move of the instrument panel relative to the cowl member through contact thereof with said upper face wall of the cowl member, the second restriction portion being configured to restrict an upward move of the instrument panel relative to the cowl member through contact thereof with said rear face wall of the cowl member.

2. The instrument panel support structure of a vehicle of claim 1, wherein said second restriction portion which extends obliquely forward and downward from the lower portion of the front-side portion of said instrument panel contacts a bracket which extends obliquely rearward and upward from the rear face wall of said cowl member.

3. The instrument panel support structure of a vehicle of claim 2, wherein said second restriction portion is formed integrally with a duct member which is provided at said instrument panel.

4. The instrument panel support structure of a vehicle of claim 2, wherein said first and second restriction portions are respectively comprised of plural portions which are located away from each other in a vehicle width direction.

5. The instrument panel support structure of a vehicle of claim 3, wherein said first and second restriction portions are respectively comprised of plural portions which are located away from each other in a vehicle width direction.

6. The instrument panel support structure of a vehicle of claim 1, wherein said second restriction portion is formed integrally with a duct member which is provided at said instrument panel.

7. The instrument panel support structure of a vehicle of claim 6, wherein said first and second restriction portions are respectively comprised of plural portions which are located away from each other in a vehicle width direction.

8. The instrument panel support structure of a vehicle of claim 1, wherein said first and second restriction portions are respectively comprised of plural portions which are located away from each other in a vehicle width direction.

* * * * *